Nov. 28, 1961     J. H. CRAWFORD     3,010,366

LENS

Filed May 27, 1954

Inventor
James H. Crawford
By Williamson, Williamson, Schroeder, + Adams
Attorneys 3,010,366
LENS
James H. Crawford, Watertown, S. Dak.
(115 E. Pedregosa, Santa Barbara, Calif.)
Filed May 27, 1954, Ser. No. 432,825
5 Claims. (Cl. 88—54)

This invention relates to a lens and more particularly to a novel lens having a combination of different focal lengths.

Many types of multi-focal lenses have been devised for spectacles or eye glasses and most of these utilize inserts constructed of glass having a different index of refraction from that of the main body of the lens. Because of the differences in refractive index between the glass insert and the main body of the lens and because of the lines of juncture between the insert and the main body, the eye experiences a "jump" when moving across the juncture. It has been recognized that certain precautions may be taken to minimize the effect of the jump. Thus, in ordinary bi-focal lenses, the insert area is selected with care so that it will not be necessary to use the smaller area of shorter focal length for normal viewing of distant objects. However, when reading or viewing close objects, the eyes naturally are lowered to view the words or close objects through the smaller area, which is at a lower medial position on the lens body.

To further minimize the visual jump which occurs when the line of sight of the eye traverses the juncture between the main lens body and the smaller bi-focal area it has been proposed that, instead of having an insert of different refractive index optically ground to the same mathematical formula as the body of the lens, a second area be ground upon the lens body wherein the index of refraction is the same throughout the body and the bi-focal area but the difference in focal length is obtained by the cylindrical grinding of a smaller area and creating in effect a lens upon a lens. The smaller focal lens area thus appears as a circular mount having concentric annular zones which are blended into the surface of the main lens body so as to eliminate the sharp jump formerly experienced by the user and to substitute continuous vision of progressively changing focal length as the eye makes the transition. Although this concentric area of same refractive index has aided the optical jumping problem, there is still another problem which exists and cannot be solved by the circular grinding method employed in the prior art. This problem involves the point of focus which is necessarily achieved by cylindrical or circular grinding of the lens. In the case of persons who require a particularly strong bi-focal prescription, the area corrected for reading may be so limited as to include only a word or two because of the point focus.

It is within the contemplation of my invention to employ the benefits of the type of lens having a single refractive material and smooth transition of changed focal lengths while providing for a new concept in lens formulation which will broaden the viewed area through the smaller lens portion of shorter focal length.

It is therefore an important object of the invention to provide a multi-focal lens in which a smaller area within the total lens is formed such as to have a shorter focal length and to provide correction over a width of focus rather than at a point.

It is another object of the invention to provide a lens of the class described in which the material has a single refractive index throughout the same and in which a lens hillock is superimposed upon the main lens body with the width of the hillock substantially greater than its height.

It is a still further object of the invention to provide a raised auxiliary lens on the surface of a main lens body which will minimize transition jump in the line of sight of a user, yet which will permit optical correction for close work over a useful width of vision.

These and other objects and advantages of the invention will more fully appear from the following description made in connection with the accompanying drawings, wherein like reference characters refer to the same or similar parts throughout the several views, and in which.

Figure 1:
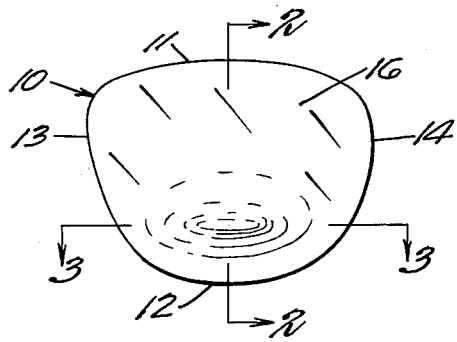
FIG. 1 is a rear view of my lens showing the appearance and position of the hillock formed integrally therewith.
Figure 2:
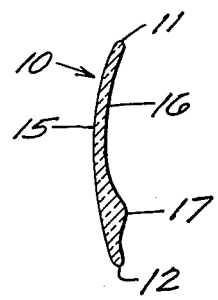
FIG. 2 is a vertical section of the lens taken across the hillock on the line 2—2 of FIG. 1.
Figure 3:
FIG. 3 is a horizontal section taken lengthwise of the hillock on the line 3—3 of FIG. 1.

With continued reference to the drawings, my invention contemplates the use of a spectacle lens indicated generally at 10 which will have the usual shape and configuration for interfitting with the framework of spectacles or eye glasses and may be constructed of lens glass having a predetermined refractive index and other qualities suitable to lens use. The lens 10 has an upper edge 11, a lower edge 12, and side edges 13 and 14 of the general configuration shown, although it is to be understood that shapes ranging from circular to rectangular may be effectively employed for the purposes described. The body of the main lens has a front surface 15 and a rear surface 16 as shown in FIGS. 1, 2 and 3, and the curvature of the front face 15 is preferably made in accordance with usual practices with a cylindrical grinding machine which forms an arcuate surface thereover. The inner surface of lens 10 may be ground at its outer periphery with a cylindrical grind, or may be formed with a grinding device in which a pattern is employed to achieve the proper depth and curvature of the entire inner surface, following which the lens is polished.

Formed at a medial lower position on one of the faces of the lens 10 and, in the instant case, on the rear face 16, is a transparent hillock or mound 17 which is formed integrally with the remainder of the lens 10 and preferably constitutes a continuation of the optical glass having the same refractive index as the apex or body portion constituting the main area of the lens. The hillock or mound 17 may assume a variety of shapes in accordance with the needs of the individual user but must of necessity be non-circular in order to achieve the results of the invention herein disclosed, and is so named because the surface defines a small hill-like rise with respect to the surrounding surface area. Since the hillock or mound is non-circular, cylindrical or circular grinding apparatus is not employed for that portion of the lens. It is necessary to use a guided grinding unit or other means for achieving the contours according to the prescription, and the hillock 17 when formed, will be elongated and somewhat ovoid in shape and disposed with its lengthwise disposition substantially horizontal and in spaced relation with the upper edge 11 and the lower edge 12 of lens 10. The hillock is also preferably centrally located with respect to the side edges 13 and 14. The hillock is formed so that the contours are non-circular and have a long axis lying horizontally while the short axis lies vertically. The hillock 17 has the characteristics of a superimposed lens over a line focus rather than a point focus. The main body of lens 10 is preferably constructed to give a point focus for distance viewing, and the hillock 17, because of its elongated shape, will present a focus of a predetermined width for close work such as reading. The line focus becomes particularly useful where the hillock is of short focus or optically strong. Thus, where a user must of necessity have a strong multi-focal prescription to enable him to read, the point focus which is characteristic of ordinary bi-focals of either the insert type having a different index of refraction, or of the superimposed circular mound, will restrict his clear vision to a small area and thus reduce his efficiency in reading. In the past, it has been considered a necessary evil in order to obtain the lens correction which will give such a user sharp image. Under the present invention, however, a sharp image may be obtained in a horizontal line for a much greater distance than would ordinarily be expected and the user, even though the lens prescription is of necessity strong, can view a larger number of words at a glance in the horizontal direction. Since this is the form in which printed words lie, the efficiency of reading will be increased since he can see more of the subject matter at any instant without shifting his line of vision.

Figure 4:
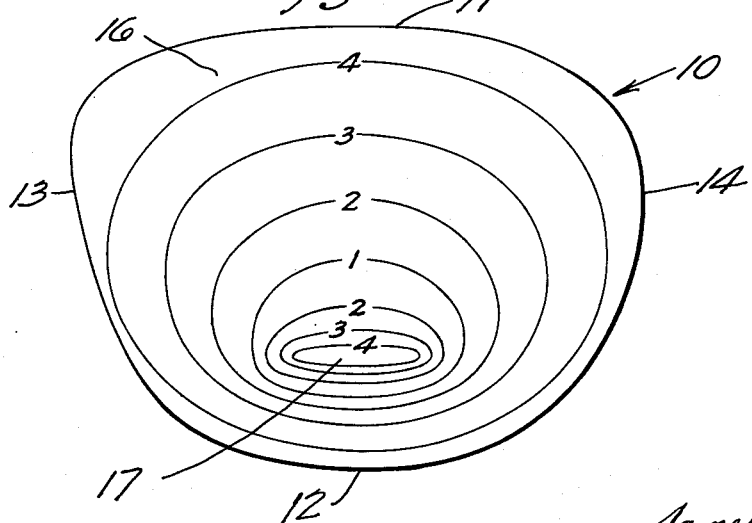
FIG. 4 is an enlarged topographical representation of the contour lines of a characteristic lens made according to my invention and illustrating the variations between the general shape of the hillock as opposed to the surrounding main body.

In addition to effecting a line focus in a horizontal direction, I have found that it is possible to preserve the effectiveness of merging lens formations to minimize the jump which is experienced when the user of a bi-focal optical lens causes his line of vision to be shifted from the bi-focal area through the main portion of the lens. The contours of the combined multi-focal lens thus appear as in FIG. 4 with the small elongated lines indicating the position near the crown of the hillock area, and the lines outwardly therefrom in decreasing number indicating the contours of the hillock as it approaches the regular rear formation of the main body of lens 10. After passing through the lowermost contour, the regular contour lines are again of increasing number outwardly toward the outer edges of the lens, all as shown in FIG. 4.

It may thus be seen that I have devised a multi-focal lens which can be constructed of a material of a single refractive index and which provides as a superimposed hillock, a short focus portion which will create a line of clear vision rather than a point, and will merge smoothly into the main body of the lens so as to permit normal distance viewing with a transition of the user's line of vision from the hillock area to the main body portion of the lens.

It will, of course, be understood that various changes may be made in the form, details, arrangement and proportions of the various parts without departing from the scope of my invention.

What is claimed is:

1. A multi-focal spectacle lens comprising, a body formed of transparent optical material having an upper edge, a lower edge, a front surface and a rear surface, and generally ground to a predetermined focal length; and a transparent elongated hillock having a line focus formed integrally with said body at a medial location on one of the surfaces thereof, said elongated hillock having smoothly sloping sides and ends merging into said body surface and having its general longitudinal disposition oriented in horizontal spaced relation with said upper and lower edges, whereby said elongated hillock will provide a corrected viewing area along a line of different focal length from that of said body and will be capable of simultaneously covering a width which will increase the efficiency of the user's horizontal vision such as in reading lines of words.

2. A multi-focal spectacle lens comprising, a body formed of transparent optical material having an upper edge, a lower edge, a front surface and a rear surface, and generally ground to a predetermined focal length; and a transparent elongated hillock having a line focus formed integrally with said body and having the same index of refraction as said body at a medial location on one of the surfaces thereof, said elongated hillock being of substantially smaller area than said body and merging smoothly thereinto, the general longitudinal disposition of the elongated hillock lying in horizontal spaced relation with said upper and lower edges, whereby said elongated hillock will provide a corrected viewing area along a line of different focal length from that of said body and will be capable of simultaneously covering a width which will increase the efficiency of the user's horizontal vision such as in reading lines of words.

3. A multi-focal spectacle lens comprising, a main body formed of transparent optical material having an upper edge, a lower edge, a front surface and a rear surface, and generally ground to a predetermined focal length; and a transparent elongated hillock having a line focus formed integrally with said body on the rear surface thereof at a medial location, the line focus of said elongated hillock having a shorter focal length than that of the main body and lying in a general horizontal relation with respect to its longitudinal disposition, whereby said elongated hillock will provide a corrected area of vision of shorter focal length from that of said body and capable of simultaneously covering a horizontal width of viewing area by virtue of the elongated hillock structure.

4. A multi-focal spectacle lens comprising, a main body formed of transparent optical material having an upper edge, a lower edge, a front surface and a rear surface and generally ground to a predetermined focal length; and a transparent hillock formed on one of the surfaces of said main body at a medial location thereon, said hillock having the same index of refraction as that of the main body, the contour lens of the hillock being more elongated from side to side than from top to bottom and providing a line focus and merging gradually into the contour lens of the main body, the latter being more nearly circular in nature.

5. A multi-focal optical lens comprising, a body formed of transparent optical material having an upper edge, a lower edge, a front surface and a rear surface, and generally ground in circular form to a predetermined focal length; and a transparent elongated hillock and having a line focus and formed from integral material so as to produce a non-cylindrical shape of general ovoid character, the longer axis of which lies in horizontal relation with respect to said upper and lower surfaces of the main body and the shorter axis of which lies vertical with respect thereto.

References Cited in the file of this patent

UNITED STATES PATENTS

| | | |
|---|---|---|
| 932,965 | Conner | Aug. 31, 1909 |
| 1,106,629 | Cross | Aug. 11, 1914 |
| 2,182,537 | Haussmann | Dec. 5, 1939 |
| 2,399,706 | Rones | May 7, 1946 |
| 2,405,989 | Beach | Aug. 20, 1946 |